United States Patent
Hayes et al.

(10) Patent No.: US 7,323,882 B1
(45) Date of Patent: *Jan. 29, 2008

(54) SYSTEM TO PLACE RECEPTACLES AND DISTRIBUTION BLOCKS

(75) Inventors: Daniel L. Hayes, Kendallville, IN (US); Shawn J. Kondas, Kendallville, IN (US)

(73) Assignee: Pent Technologies, Inc., Kendallville, IN (US)

( * ) Notice: Subject to any disclaimer, the term of this patent is extended or adjusted under 35 U.S.C. 154(b) by 498 days.

This patent is subject to a terminal disclaimer.

(21) Appl. No.: 10/845,678

(22) Filed: May 14, 2004

Related U.S. Application Data

(60) Provisional application No. 60/470,560, filed on May 14, 2003.

(51) Int. Cl.
*G01R 31/04* (2006.01)
*G01R 19/00* (2006.01)
(52) U.S. Cl. .................... 324/538; 324/66; 324/67
(58) Field of Classification Search ........... 324/538, 324/66
See application file for complete search history.

(56) References Cited

U.S. PATENT DOCUMENTS

| | | | | |
|---|---|---|---|---|
| 4,593,505 A | | 6/1986 | Russell .................... 52/221 |
| 4,775,328 A | * | 10/1988 | McCarthy ................ 439/211 |
| 5,092,787 A | * | 3/1992 | Wise et al. .............. 439/215 |
| 5,096,433 A | * | 3/1992 | Boundy ................... 439/215 |
| 5,112,240 A | | 5/1992 | Nienhuis et al. .......... 439/215 |
| 5,349,135 A | | 9/1994 | Mollenkopf et al. ........ 174/48 |
| 5,381,994 A | | 1/1995 | Welch ..................... 248/346 |
| 5,764,043 A | * | 6/1998 | Czosnowski et al. ........ 324/66 |
| 6,021,613 A | | 2/2000 | Reuter et al. ............ 52/241 |
| 6,256,950 B1 | | 7/2001 | Laukhuf et al. .......... 52/239 |
| 6,344,969 B1 | * | 2/2002 | Lord et al. ............... 361/686 |
| 6,357,199 B2 | | 3/2002 | Laukhuf et al. .......... 52/741.1 |
| 6,407,542 B1 | * | 6/2002 | Conte .................... 324/158.1 |

\* cited by examiner

*Primary Examiner*—Anjan Deb
(74) *Attorney, Agent, or Firm*—Taylor & Aust, P.C.

(57) ABSTRACT

An electrified wall panel in a modular furniture environment includes a plurality of multi-port electrical distribution blocks diversely located throughout the panel. Certain ones of the multi-port electrical distribution blocks are fixed to wall panel frame members and other ones of the multi-port electrical distribution blocks are free of the wall panel. A plurality of jumper cables, each having connectors at opposite cable ends are adapted to mate with any one of the multi-port electrical distribution block ports. The cables electrically interconnect the distribution blocks to form one complete circuit. There are a plurality of electrical receptacles, each having an electrical connector near one end which are electrically coupled to a port of a corresponding multi-port electrical distribution block. The system is assembled by fixing a jumper mounting bracket to a jumper cable near one end of the jumper cable. The jumper mounting bracket is attached to a support member. A modular electrical component such as an electrical receptacle is electrically connected to the power distribution block and is mechanically connected to the jumper mounting bracket thereby stabilizing the power distribution system on the support member.

12 Claims, 3 Drawing Sheets

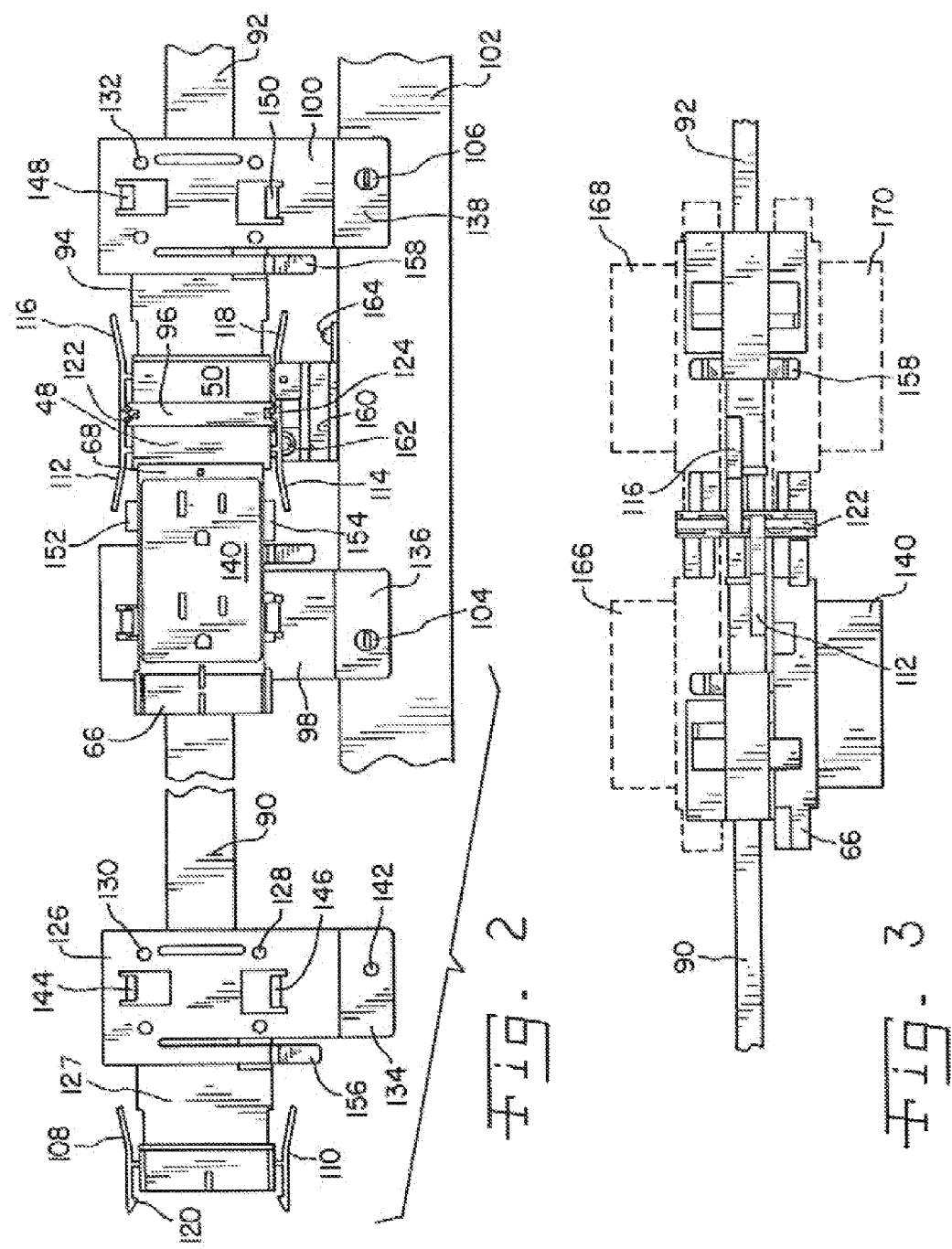

US 7,323,882 B1

SYSTEM TO PLACE RECEPTACLES AND DISTRIBUTION BLOCKS

CROSS REFERENCE TO RELATED APPLICATIONS

This application claims the benefit of U.S. Provisional Patent Application No. 60/470,560, filed May 14, 2003, and entitled MODULAR ELECTRICAL DISTRIBUTION SYSTEM IN A MODULAR WALL PANEL ASSEMBLY.

Other related applications include U.S. patent application Ser. No. 10/845,695, filed on even date herewith, entitled JUMPER WITH INTEGRAL RECEPTACLE BRACKET, and U.S. patent application Ser. No. 10/846,088, filed on even date herewith, entitled DOUBLE "E" ELECTRICAL DISTRIBUTION BLOCK, the entire disclosures of which are specifically incorporated herein by reference.

BACKGROUND OF THE INVENTION

1. Field of the Invention

The present invention relates to power distribution systems and more particularly to a power distribution system for supplying power to a plurality of spaced apart work stations, for example, as found in a modular furniture environment. Such modular electrical distribution systems are frequently used in wall panel assemblies within an office environment.

2. Description of the Related Art

Conventionally, an electrical distribution wiring harness has an extruded metal wire channel extending from a center block, and the receptacle brackets are attached directly to the metal wire channel which is rigidly and permanently mounted to a center block. Frequently, electrical distribution wires are enclosed in a metal conduit, or raceways extending along an edge of a wall panel, commonly at or near the bottom edge. Some modular wiring systems include power distribution servers for receiving electrical receptacle modules which have cables permanently attached for coupling to connectors. Typically one type of connector is used to interconnect wiring in separate panels, and several additional types of special purpose connectors are employed to connect wiring between wall panels extending at different angles to one another, or to branch the power supply lines into, for example, vertical and/or multiple horizontal branches. In other cases, a still further type connector is used to support and supply power to electrical receptacles

SUMMARY OF THE INVENTION

The present invention provides an electrical wiring system having a minimal number of electrical components for wiring a wide variety of modular environments in a space saving manner.

The invention comprises, in one form thereof, a process of locating, interconnecting and energizing a plurality of electrical receptacles at preferred locations relative to a modular wall panel frame by attaching a plurality of multi-port electrical distribution blocks to certain panel frame members, each closely adjacent a preferred receptacle location and electrically coupling selected pairs of electrical distribution blocks by connecting each of two opposed jumper cable connectors to a corresponding port of one of the selected pair. This process is repeated until each electrical distribution block attached near a preferred receptacle location has at least one cable connector coupled thereto and every selected and coupled pair of electrical distribution blocks is electrically coupled by way of coupled pairs to every other electrical distribution block. A complete circuit should be formed with no two of the selected electrical distribution blocks electrically isolated from one another and with no redundant jumpers. Electrical receptacles are then electrically joined to certain ones of the plurality of multi-port electrical distribution blocks and a preferred one of the multi-port electrical distribution blocks is electrically coupled to a source of electrical energy.

Also in one form, the invention, a power distribution system is assembled and stabilized on a support member by fixing a jumper mounting bracket to a jumper cable near one end of the jumper cable, fastening a power distribution block to the support member, electrically coupling the jumper cable one end and the power distribution block and attaching the jumper mounting bracket to the support member. A modular electrical component such as an electrical receptacle is electrically connected the power distribution block and mechanically connected to the jumper mounting bracket. A second power distribution block is fastened to the support member at a preferred location relative to the location of the first mentioned distribution block. Two additional jumper mounting brackets are fixed to a second jumper cable, one near each of the opposite ends of the second jumper cable and one end of the second jumper cable is electrically coupled to the first mentioned power distribution block. The other end of the second jumper cable is electrically coupled to the second power distribution block. Finally, the two additional jumper mounting brackets are attached the to the support member.

An advantage of the present invention is that it provides an increased receptacle density usage in a single panel. The electrical harness packaging can be reduced by as much as 90% and electrical harness weight is reduced Another advantage of the present invention is the use of flexible jumpers and multi-port distribution blocks to re-route and branch or "fan out" electrical power with in the panel, that is, the distribution block can be used to "split" power internally in a panel, to other locations inside the same panel, or to other panels. The distribution blocks may be mounted vertically, horizontally or inverted on any flat surface. The center port on a distribution can be used for baseline or beltline connections without sacrificing the receptacle port Further advantage of the present invention include the fact that the distribution block can "float" within the panel. The elimination of a channel or wireway provides more room for data and voice cabling, hence an increase in the useable area for data cable routing results. There is and improved immunity to poor handling, during panel installation and shipping. Flexible jumpers allow ease of panel-to-panel connecting.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is more detailed side elevation view of illustrative components of the power distribution assembly of FIG. 1;

FIG. 3 is top plan view of a portion of FIG. 2; and

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
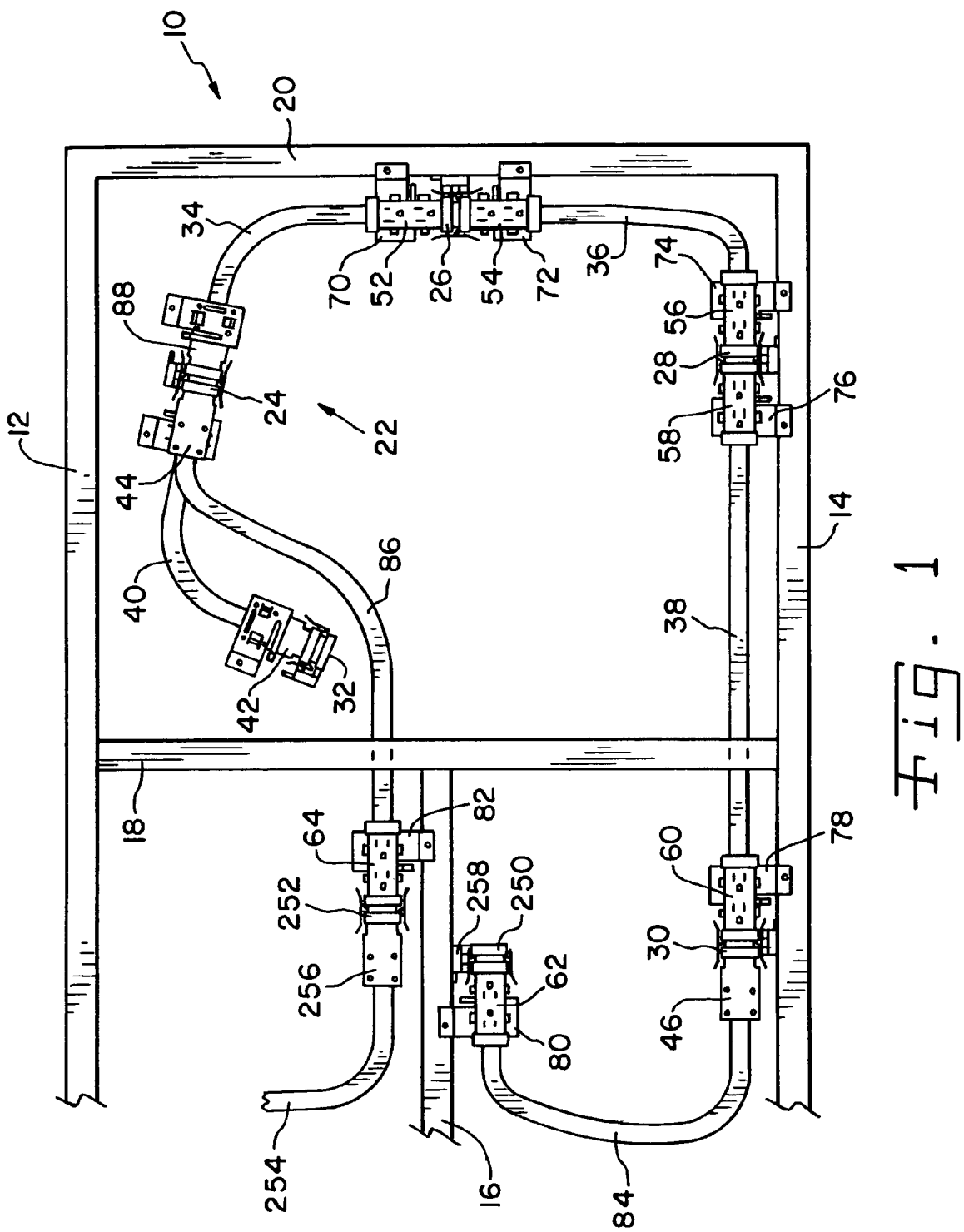
FIG. 1 is a side elevation view of a modular wall panel with numerous power distribution assembly components mounted thereon.

Referring now to the drawings and particularly to FIG. 1, there is shown an electrified wall panel frame 10 having numerous wall panel frame members including horizontally extending members 12, 14 and 16 as well as vertically extending members 18 and 20. The frame members provide a fixed, rigid support for a power distribution assembly 22 which includes multi-port power distribution blocks 24, 26, 28, 30, 32, 250 and 252 electrically joined by flexible multiconductor jumper cables 34, 36, 38, 40, 84 and 86 respectively. Each jumper cable includes an electrical connector such as 42, 44 or 46 at each of its opposite ends and these connectors are adapted to electrically mate with corresponding connector receiving ports such as 48 and 50 (FIG. 2) in the power distribution blocks whereby all the power distribution blocks (sometimes simply Adistributions@) may be electrically interconnected to form a complete electrical circuit. Preferably, each distribution includes three or more ports at each end. Electrical receptacles such as duplex outlets 52, 54, 56, 58 and 60 are electrically connected by an end connector such as 66 or 68 (FIG. 2) to a corresponding distribution 26, 28 and 30 respectively. The electrical receptacles 52, 54, 56, 58 and 60 are also mechanically secured to support or component mounting brackets 70, 72, 74, 76 and 78 respectively. Details of this mechanical support will be discussed in detail in conjunction with FIGS. 2 and 3. Additional electrical receptacles 62 and 64 are shown mechanically supported by mounting brackets 80 and 82 at the ends of respective jumper cables 84 and 86 with distributions 250 and 252 ready to be further connected as illustrated by jumper 254 and connector 256. To illustrate some options, distribution 250 is shown supported by bracket 258 while distribution 252 is supported only by the jumper mounting bracket 82. Distribution 24 is shown as free floating, that is, it is not fastened to any panel frame member although it could be. Fastening is not as important when no receptacle is present. Distribution 24 receives connector 44 of jumper cable 86, connector 88 of jumper cable 34 as well as the connector opposite connector 42 on jumper cable 40. This distribution thus provides a split or branching of the electrical circuit to both the free connector 42 and its attached distribution 32, for example, to either receive an electrical power input or to supply energy to another wall panel, and by way of jumper cable 86, a connection ready to connect to additional distributions and receptacles mounted on frame member 16. As viewed in FIG. 1, the wall panel frame member 14 is near floor level while frame member 16 is at a beltline or desktop level. Hence both baseline receptacles 56, 58 and 60, and beltline receptacles 64 are provided.

Referring now to FIGS. 2 and 3, there is shown an illustrative collection of power distribution components of the types illustrated in FIG. 1. Jumper cables 90 and 92 have respective end connectors such as 94 mated with the central ports of a multi-port power distribution block 96. The two connectors have associated mounting brackets 98 and 100 attached to the panel frame member 102, for example, by mounting screws 104 and 106. Each of the jumper cable connectors has a pair of resilient arms 108, 110, 112, 114, 116 and 118 which have hooks such as 120 near respective free ends for engaging a pair of transverse hook accepting grooves 122 and 124 to prevent inadvertent disengagement from the distribution 96.

The jumper cable connector mounting brackets such as 98, 100 and 126 are fixed to their corresponding jumper cable connectors by rivets such as 128, 130 and 132. Moreover, the jumper connector mounting brackets each include a base portion having a pair of support member spanning flanges 134, 136 and 138 for straddling the support member 102. Each spanning flange includes a threaded fastener accepting aperture 142 for fixing the jumper cable connector to support member 102 as by screws 104 and 106.

Electrical receptacle 140 is electrically connected to distribution 96. Of course, it is also mechanically connected, but providing an electrical path is the primary purpose of the connection. For mechanical support, the receptacle relies on the jumper connector mounting bracket 98, hence, this bracket 98 is a dual purpose structure. As best seen on brackets 100 and 126, there is a retainer on each of the opposed bracket sides for supporting an electrical component such as the receptacle 140. This retainer includes a pair of modular electrical receptacle clamping or retaining tabs 144 and 146 or 148 and 150 which extend outwardly from the connector bracket. Pairs of opposed tabs are designed to engage a corresponding pair of ears on the receptacle. The engaged ears in FIG. 2 are obscured by the tabs, but ears such as 152 and 154 are visible. Each jumper bracket further includes a second pair of modular electrical component retaining tabs extending outwardly from a connector grasping portion side opposite the side visible in FIG. 2 for similarly spanning and mechanically securing a further electrical component. In the embodiment shown in FIG. 2, electrical receptacle 140 is slid into engagement with cable/receptacle mounting bracket without the use of tools. A spring bias tab 156 or 158 aids receptacle retention by engaging the back of an electrical receptacle (a retention groove may be present on the receptacle back side) urging that receptacle firmly against the mounting tabs 144 and 146 or 148 and 150 providing a rigid mounting during normal use. Only one electrical receptacle 140 is shown in FIGS. 2 and 3, however, the distribution 96 has three ports facing each way and may accept additional receptacles at 166, 168 and 170 if desired. Each of the central ports in distribution 96 receives a connector of one of the jumper cables 90 and 92.

The multi-port power distribution block 96 is fastened to or joined with rigid support member 102 by a block mounting bracket 160. The block mounting bracket 160 and distribution block 96 may be joined by threaded fasteners such as screw 162 and the mounting bracket 160 coupled with fixed structure 102 using any suitable fastening technique, such as with a screw 164 passing through a threaded fastener receiving aperture in the bracket base and into the support.

Figure 4:
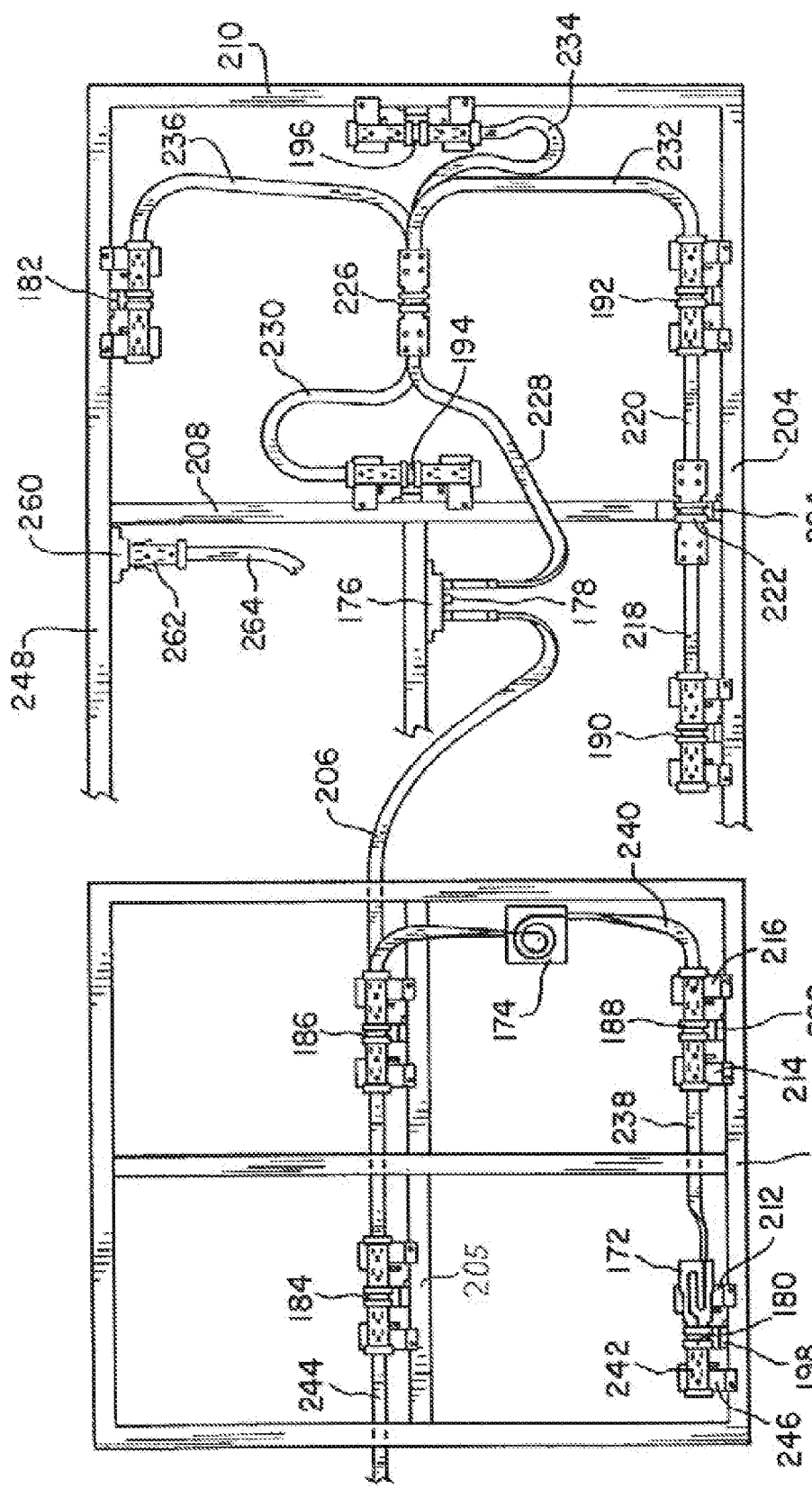
FIG. 4 is a side elevation view showing further components of a power distribution assembly as mechanically and electrically coupled together.

FIG. 4 is illustrative of some of the further wide variations of applications of the present invention. Here, all of the jumper cables may be the same length, for example four feet, to wire eight foot wide panels with one distribution and one or more receptacles near the center of each panel. With this uniform length jumper system, spans greater than four feet entail the use of two or more jumpers with one or more receptacle-free distributions joining them. Alternatively, a few standardized different length jumpers may be employed. Excessive lengths of jumper cable may be stowed in any convenient way. For example, variable volume cable accumulators such as the telescoping enclosure 172 which receives cable in a serpentine pattern, or enclosure 174 which receives cable in a coiled or spiral pattern may be employed. In FIG. 4, at least two electrical receptacles are connected to outer ports of distributions 182, 184, 186, 188, 190, 192, 194 and 196. Multi-port distribution block 188, for example, includes at least six connector ports, but may include additional connector ports depending upon the application. The center port on each side couples with a jumper cable 238 and 240. The outer most pair of connector ports at each end of multi-port distribution block is positioned adjacent to a sidewall of a wall panel affixed to the fixed structure. Each outermost connector port receives an electrical receptacle such as 242 or other modular electrical component therein. Normally, there would be a receptacle face plate which extends through an opening formed in the wall panel (not shown) affixed to fixed structure. Distributions 180 and 188 are fastened to a baseline wall panel frame member 202 by distribution block mounting brackets 198 and 200. Their corresponding jumper cable connectors are attached to the frame member 202 by jumper mounting brackets 246, 212, 214 and 216. The three illustrated baseline receptacles are also mechanically connected to the jumper brackets 246, 214 and 216. Receptacles are provided at a higher beltline elevation by the distributions 184 and 186 which are fastened to a higher horizontal frame member 205.

FIG. 4 illustrates a wall panel connected to a further wall panel portion electrically by jumper 206. In this further wall panel portion, distributions 190 and 192 are shown electrically coupled by two jumper cables 218 and 220 which are joined one to the other by a further distribution 222. The remaining ports on distribution 222 are illustrated as being idle, but are available for further electrical connections. Distribution 222 is shown as attached to support member 204 by another distribution mounting bracket 224. In contrast, distribution 226 floats freely in space suspended only by the jumper cables 228, 230, 232, 234 and 236. Distribution 182 is shown fastened to an upper horizontally extending wall panel frame member 248 supplying electrical receptacles at or near head height for overhead lighting, air circulating fans, etc., or providing an opportunity for a ceiling power input jumper connection. Distributions 194 and 196 are shown fastened to vertically extending frame members 208 and 210 respectively. These can supply additional receptacles at further locations and/or heights other than beltline, baseline and head height.

Power input may be to any unoccupied port of any distribution block, but a given (connected) circuit should not receive power at more than one port. For example, the three port distribution 176 which is configured substantially like one-half of the previously described distributions, may have a central port 178 as the power input port. Alternatively, a central port of distribution 180 would be a convenient location for a baseline power entry jumper, or a central port of distribution 182 would be a convenient location for a ceiling power entry jumper. With either of the last mentioned alternatives, the central port 178 of distribution 176 would be available to convey power to a third wall panel as would be the jumper 244. The three port distribution is suitable for a number of other uses. One such three port distribution 260 is shown fixed to the upper horizontal panel frame member 248 to receive both a further receptacle 262 and an additional jumper connector (not visible) and cable 264 for connection as desired. The three port distributions 176 and 260 are depicted as mounted orthogonally to one another in FIG. 4. Many further variations on the wiring pattern should now be apparent. Note, there is only one electrical path from the source to any given receptacle. Further there is one and only one electrical path from any one receptacle to any other receptacle. Thus, any circuit is both connected and cycle free.

One technique for locating, interconnecting and energizing a group of electrical receptacles at preferred locations on the wall panel frame begins by deciding on preferred locations for those receptacles. Distributions are then attached near the preferred locations, for example, as positioned in FIG. 1 or 4. Next, pairs of distributions are selected and each selected pair is electrically coupled by connecting each of two opposed jumper cable connectors to a corresponding port of one of the selected pair. For example, if distributions 24 and 26 of FIG. 1 are selected, that pair is coupled by jumper 34. Of course, had distributions 26 and 30 been selected, an altogether different, but equally operable wiring pattern would result. The steps of selecting and electrically coupling are repeated until each electrical distribution block attached near a preferred receptacle location has at least one cable connector coupled thereto and every selected and coupled pair of electrical distribution blocks is electrically coupled by way of coupled pairs to every other electrical distribution block. This insures no two of the selected electrical distribution blocks will be electrically isolated from one another. If the same pair of distributions is selected a second time, a redundant electrical coupling is omitted. Care should also be taken to avoid coupling distributions in a complete cycle, that is, where there is an electrical circuit from one distribution through a path of jumpers and distributions which comes back and again connects to the one distribution. Should that occur, any one of the jumpers in the cycle may be deleted. Electrical receptacles are then joined to certain ones of the plurality of multi-port electrical distribution blocks to provide the sought after positioning. A preferred one of the multi-port electrical distribution blocks is then electrically coupled to a source of electrical energy. Of course, selected ones of the opposed jumper cable connectors should be fastened to certain panel frame members and the selected electrical receptacles mechanically secured to corresponding adjacent jumper cable connectors. In the event that the separation between the selected pair of multi-port electrical distribution blocks exceeds the length of a readily available jumper as is the case, for example, of distributions 190 and 192 in FIG. 4, two jumper cables are joined by connecting one jumper cable connector of each of the two jumper cables to an additional multi-port electrical distribution block, e.g., distribution 222, and connecting the other connector of each of the two jumper cables to a corresponding port of one of a selected pair of multi-port electrical distribution blocks. The process may include joining at least three jumper cables to a preferred one of the multi-port electrical distribution blocks such as 226 in FIG. 4, to provide electrical interconnection among three otherwise mutually electrically isolated pairs of selected and electrically coupled multi-port electrical distribution blocks.

Multi-port electrical distribution blocks such as 180, 188 and 190 are attached to generally horizontally extending panel frame members such as 202 and 204 while certain others of the of multi-port electrical distribution blocks such as 194 and 196 are attached to generally vertically extending panel frame members 208 and 210. Similarly, multi-port electrical distribution blocks 180 and 188, for example, are attached to generally horizontally extending panel frame members at a first elevation and certain others of the of multi-port electrical distribution blocks like 184 and 186 are attached to a generally horizontally extending panel frame member at a second elevation displaced vertically above the first elevation to thereby provide electrical receptacles at a baseline level and electrical receptacles at a beltline level. At least three jumper cables are joined to distribution block 186. Cable 206 receives electrical energy from a source, a second of the three cables is electrically coupled with distribution blocks 180 and 188 to provide electrical energy to receptacles at the baseline level, and a third of the three cables is electrically coupled to distribution block 184 to provide electrical energy to receptacles at the beltline level.

The present invention may employ cables, connectors and distributions having just three wires, a hot line, a neutral and a ground. A somewhat conventional eight wire may also be employed. A three phase system may be employed. Certain connector terminals may be omitted or unused and other circuits may be envisioned as is known in the art. Of course, the connectors and/or distributions are desirably asymmetrical to assure proper polarity and interconnection of the correct circuits.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A process of locating, interconnecting and energizing a plurality of electrical receptacles at preferred locations relative to a modular wall panel frame, comprising:
   substantially rigidly attaching a plurality of multi-port electrical distribution blocks to certain panel frame members, each closely adjacent a preferred receptacle location;
   selecting pairs of electrical distribution blocks from the plurality;
   electrically coupling selected pairs of electrical distribution blocks by connecting each of two opposed jumper cable connectors to a corresponding port of one of the selected pair;
   repeating the steps of selecting and electrically coupling until each electrical distribution block attached near a preferred receptacle location has at least one cable connector coupled thereto and every selected and coupled pair of electrical distribution blocks is electrically coupled by way of coupled pairs to every other electrical distribution block whereby no two of the selected electrical distribution blocks are electrically isolated from one another;
   electrically joining an electrical receptacle to certain ones of the plurality of multi-port electrical distribution blocks; and
   electrically coupling a preferred one of the multi-port electrical distribution blocks to a source of electrical energy.

2. The process of claim 1, including the additional step of fastening selected ones of the opposed jumper cable connectors to certain panel frame members.

3. The process of claim 1, including the additional step of mechanically securing selected electrical receptacles to corresponding adjacent jumper cable connectors.

4. The process of claim 1, including the additional steps of joining two jumper cables by connecting one jumper cable connector of each of the two jumper cables to an additional multi-port electrical distribution block and connecting the other connector of each of the two jumper cables to a corresponding port of one of a selected pair of multi-port electrical distribution blocks in the event that the separation between the selected pair of multi-port electrical distribution blocks exceeds the length of a readily available jumper.

5. The process of claim 1, including the additional step of joining at least three jumper cables to a preferred one of the multi-port electrical distribution blocks.

6. The process of claim 5, wherein the step of joining provides electrical interconnection among three otherwise mutually electrically isolated pairs of selected and electrically coupled multi-port electrical distribution blocks.

7. The process of claim 1, wherein certain ones of the multi-port electrical distribution blocks are attached to generally horizontally extending panel frame members and certain others of the of multi-port electrical distribution blocks are attached to generally vertically extending panel frame members.

8. The process of claim 1, wherein certain ones of the multi-port electrical distribution blocks are attached to generally horizontally extending panel frame members at a first elevation and certain others of the of multi-port electrical distribution blocks are attached to generally horizontally extending panel frame members at a second elevation displaced vertically above the first elevation to thereby provide electrical receptacles at a baseline level and electrical receptacles at a beltline level.

9. The process of claim 8, including the additional step of joining at least three jumper cables to a preferred one of the multi-port electrical distribution blocks, one cable of said three cables receiving electrical energy from a source, a second of said three cables electrically coupled to said certain ones of the multi-port electrical distribution blocks to provide electrical energy to receptacles at the baseline level, and a third of said three cables electrically coupled to said other certain ones of the multi-port electrical distribution blocks to provide electrical energy to receptacles at the beltline level.

10. The process of claim 1, wherein certain ones of the multi-port electrical distribution blocks are attached to generally horizontally extending panel frame members and certain others of the of multi-port electrical distribution blocks are attached to generally vertically extending panel frame members, the process including the additional step of joining at least three jumper cables to a preferred one of the multi-port electrical distribution blocks, one cable of said three cables receiving electrical energy from a source, a second of said three cables electrically coupled to said certain ones of the multi-port electrical distribution blocks to provide electrical energy to receptacles attached to the generally horizontally extending panel frame members, and a third of said three cables electrically coupled to said other certain ones of the multi-port electrical distribution blocks to provide electrical energy to receptacles attached to generally vertically extending panel frame members.

11. The process of claim 1, including the additional step of omitting the step of electrically coupling in the event a selected pair has previously been selected and electrically coupled to thereby avoid redundant coupling of pairs of electrical distribution blocks.

12. The process of claim 1, wherein each of the plurality of multi-port electrical distribution blocks attached to the certain panel frame members are attached using a distribution block mounting bracket directly connected to the respective distribution block and to the respective panel frame member.

* * * * *